United States Patent [19]

Schoenmakers

[11] Patent Number: 4,484,719
[45] Date of Patent: Nov. 27, 1984

[54] MAGNETIC-TAPE CASSETTE WITH ANTI-TELESCOPING GUIDES AND REELS

[75] Inventor: Johannes J. M. Schoenmakers, Eindhoven, Netherlands

[73] Assignee: U.S. Philips Corporation, New York, N.Y.

[21] Appl. No.: 436,532

[22] Filed: Oct. 25, 1982

[30] Foreign Application Priority Data

Oct. 28, 1981 [NL] Netherlands ............... 8104863

[51] Int. Cl.³ .................... G03B 1/04; G11B 15/32; B65H 27/00
[52] U.S. Cl. ................................. 242/199; 242/76
[58] Field of Search .................. 242/192, 197–200, 242/195, 76; 352/72–78; 360/93, 96.1–96.4, 132, 130.3–130.33

[56] References Cited

U.S. PATENT DOCUMENTS 3,692,956  9/1972  Northrup ................ 360/132
3,704,836 12/1972  Yamada ................. 242/192
4,022,402  5/1977  Morimoto .............. 242/199

FOREIGN PATENT DOCUMENTS 0021910  2/1978  Japan ................... 360/130.3

Primary Examiner—Leonard D. Christian
Attorney, Agent, or Firm—David R. Treacy

[57] ABSTRACT

A magnetic-tape cassette having two reel hubs mounted for rotation in major walls, and a length of magnetic tape which is unwound from and taken up by the reel hubs, and guided along a first long side wall having apertures for a magnetic head. For supporting the edges of the tape in directions parallel to the axes of the reel hubs, at least two tape guides each have two height guides which, near that side of the tape guide which faces the first long side wall, converge from the direction of the first long side wall towards the adjacent reel. During operation, a plane tangent to the end portion of a height guide substantially coincides with a plane tangent to the inner side of the flange of the adjacent reel hub.

18 Claims, 8 Drawing Figures

U.S. Patent    Nov. 27, 1984    Sheet 1 of 2    4,484,719
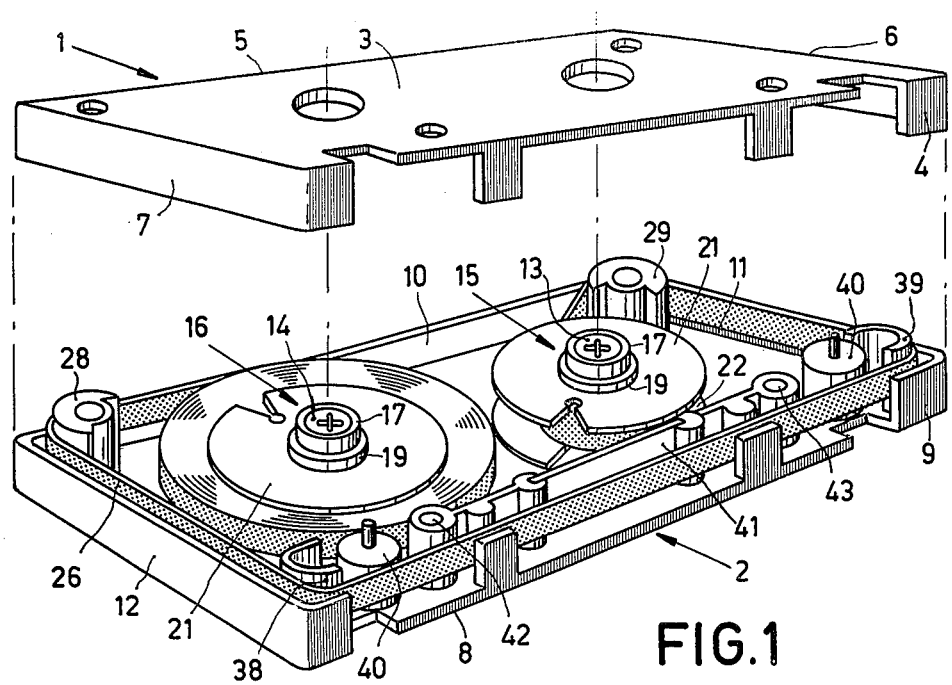
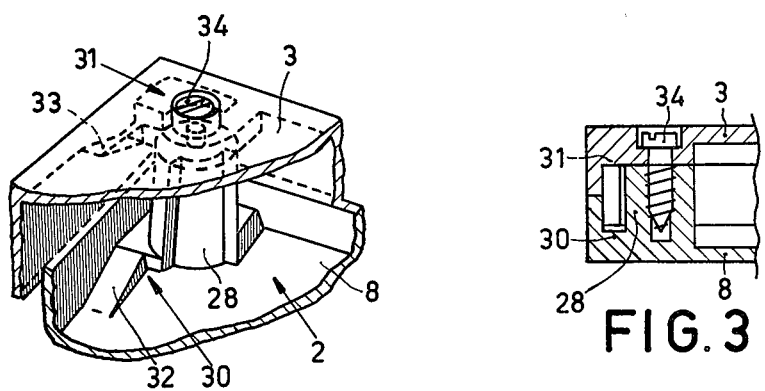
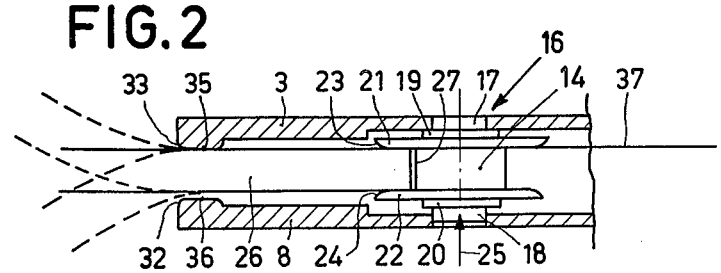

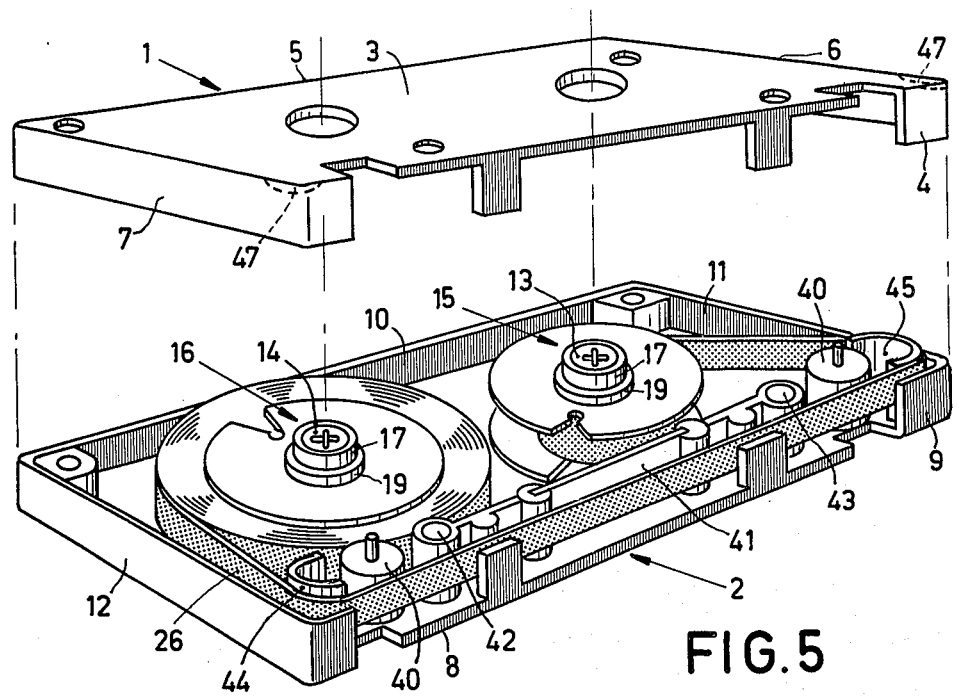
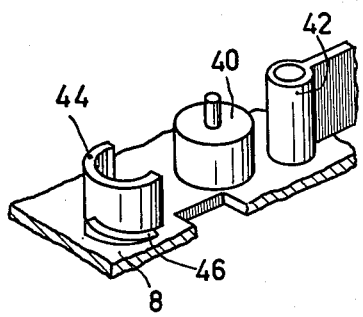
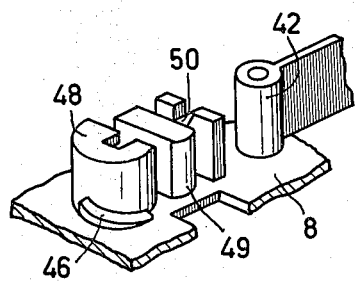
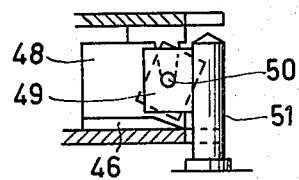

MAGNETIC-TAPE CASSETTE WITH ANTI-TELESCOPING GUIDES AND REELS

BACKGROUND OF THE INVENTION

The invention relates to a magnetic-tape cassette comprising a housing having two rectangular major walls, two long side walls and two short side walls, in which major walls two reel hubs are mounted for rotation, a first one of said long side walls being formed with apertures past which a length of magnetic tape which is unwound from and taken up by the reel hubs is guided by means of a pair of tape guides which are arranged at or near corners of the cassette housing and around which the magnetic tape passes in contact therewith.

A magnetic-tape cassette of this type, described in U.S. Pat. No. 3,394,899, is known by the name of "Compact Cassette". Generally, a comparatively large length of the magnetic tape is accommodated in the comparatively small cassette housing. Due particularly to inaccuracies in the attachment of the end of the magnetic tape to the reel hub, problems may arise when the magnetic tape is wound onto the relevant hub in that the turns of the tape are axially shifted while being wound, giving rise to so-called "telescoping". This telescoping of the magnetic tape generally gives rise to jamming of the tape inside the cassette housing as a result of friction against the major wall. Telescoping of the magnetic tape is an effect which has been known for many years and has lead to the development of various means for precluding such axial displacement of the turns of tape during winding. U.S. Pat. No. 3,675,875 describes an example of such means comprising corrugated polyester foil arranged between the turns of tape and the major walls. In principle these known corrugated foils, in the same way as other known anti-telescoping means, do not effectively eliminate the cause of telescoping, namely an incorrect attachment of the tape to the reel hubs. Therefore, despite all these solutions telescoping still occurs in practice, the known means merely serving to minimize this telescoping effect. Often the attendant friction between the respective tape edge and the foil, which are in contact over a comparatively large distance, still impairs the tape transport.

SUMMARY OF THE INVENTION

It is the object of the present invention to provide a magnetic-tape cassette which effectively precludes telescoping of the magnetic tape and thereby precludes jamming of the magnetic tape inside the cassette housing.

According to the invention the reel hubs are mounted to fit substantially without radial play in the major walls, each of the hubs is provided with flanges near its ends, which flanges each have a diameter such that, starting from the circumference of each reel hub, the flanges support at least some of the turns of tape on the hub in the axial direction; each of the tape guides is provided with two height guides for supporting the edges of the tape in directions parallel to the axes of the reel hubs; and the two height guides of each tape guide converge near that side of the tape guide which faces the first long side wall, that is, observed while moving from the first long side wall to the tape guide, the height guide surfaces converge to a spacing between the height guide end portions. The two height guides guide the tape edges at least at the area of contact between the tape and the respective guide at least when the cassette is placed on a magnetic-tape cassette apparatus, and a tangent plane to that end portion of a height guide of a tape guide which is situated near the adjacent reel hub substantially coincides with a tangent plane to the inner side of a respective one of the flanges on the relevant reel.

In this way a faulty attachment of the magnetic tape to a reel hub, which is inevitable in practice, is corrected directly by the use of height-limiting flanges on the reel hubs, which flanges need have only a limited diameter. Further, the position of each reel hub in the radial direction inside the cassette housing is optimized so that the reel hubs cannot oscillate inside the housing. In this respect it may be of advantage to limit the diameter of the flanges. The two height guides of each tape guide may have an active function as a result of the part of magnetic tape which is in contact with the tape guide, which precludes curling of the tape edge. The convergence of the height guides is important in order to correct the orientation of an obliquely directed tape, passing between the height guide and the long side wall, at the location of the height guides. These steps further ensure that during the passge of the magnetic tape between the height guides the edges of the magnetic tape are always accurately aligned relative to the reel hub, so that an accurate supply of tape to the reel hub is obtained.

In a further preferred embodiment of the magnetic-tape cassette in accordance with the invention the flanges on each reel hub have a diameter such that, starting from the circumference of the reel hub, the flanges support only a limited number of turns of tape in the axial direction, and the circumferential edges of the two flanges on each reel hub are bevelled on their inner sides. This limited diameter of each flange assists in minimizing the axial oscillation of the reel hubs. During winding such flanges may provide adequate support for the tape edges and compensate for attachment errors even after some turns have been wound onto the reel hub.

Yet another embodiment of the magnetic-tape cassette in accordance with the invention is characterized in that the reel hubs are each arranged between the major walls with a small axial clearance and the distance between the two height guides of each tape guide substantially corresponds to the distance between the two flanges on each reel hub plus the clearance. Thus, if the magnetic tape is directed obliquely relative to the height guides the tape cannot curl over between the height guides because the distance between the height guides is slightly greater than the width of the magnetic tape.

In this respect it is of advantage if each reel hub has end portions which are journalled in the major walls and which, for driving the hubs, are engageable with the drive spindles of a magnetic-tape cassette apparatus in such a way that when the cassette is in the operating position on the apparatus the axial clearance of the reel hubs relative to the major walls occurs at that major wall of the cassette housing which faces the apparatus. This has the advantage that the height guide of the magnetic-tape cassette, when the cassette has been placed on a magnetic-tape apparatus, is in line with the adjacent reel flange. Thus, the drive spindles of the apparatus ensure that the axial clearance of the reel hub occurs at the side adjacent the apparatus in a precisely defined manner.

In a further preferred embodiment of the magnetic-tape cassette in accordance with the invention two pressure elements are arranged near the tape guides adjacent the first long side wall, which elements are tiltable about an axis parallel to the long side walls and the major walls of the cassette housing. The presence of the pressure elements enables positioning errors of a capstan of the apparatus to be compensated for, which reduces the tendency of the magnetic tape to drift in the height direction.

Embodiments of the invention will be described in more detail, by way of example, with reference to the drawing.

BRIEF DESCRIPTION OF THE DRAWING

FIG. 1 is a partly exploded perspective view of a magnetic-tape cassette in accordance with the invention.

FIG. 2 is a sectional perspective view, on an enlarged scale, of a part of the cassette, showing a tape guide.

FIG. 3 is a sectional view of a part of the cassette with a tape guide.

FIG. 4 is a part-sectional view showing the path of the magnetic tape inside the cassette housing.

FIG. 5 is a partly exploded perspective view of a second embodiment of a magnetic-tape cassette in accordance with the invention.

FIG. 6 is a perspective view of parts of the magnetic-tape cassette shown in FIG. 5 which are relevant to the invention.

FIG. 7 is a perspective view of parts of a third embodiment of a magnetic-tape cassette in accordance with the invention.

FIG. 8 is a sectional view illustrating the operation of one of the parts shown in FIG. 7.

DESCRIPTION OF THE PREFERRED EMBODIMENTS

The magnetic-tape cassette shown in FIG. 1 comprises a cassette housing comprising a cover section 1 and a main section 2. The cover section 1 comprises a rectangular major wall 3, two long side-wall portions 4 and 5, and two short side-wall portions 6 and 7. The main section 2 comprises a rectangular major wall 8, two long side-wall portions 9 and 10 and two short side-wall portions 11 and 12. Upon assembly of the cover section and the main section the long side-wall portions 4 and 9 together form a first long side wall of the housing. Similarly, the long side-wall portions 5 and 10 together form a second long side wall and the short side-wall portions 6, 11 and 7, 12 form short side walls. The hubs 13 and 14 of two tape reels 15 and 16 respectively are mounted for rotation in the major walls 3 and 8. As can be seen in FIG. 4, each reel hub comprises cylindrical end portions 17 and 18 which fit rotationally and substantially without radial play in apertures in the major walls 3 and 8 respectively. Each reel hub further comprises stop portions in the form of shoulders 19 and 20 adjoining the end portions 17 and 18 respectively and having a slightly greater diameter than the end portions. The distance between the stop surfaces of the shoulders 19 and 20 is suitably slightly smaller than the internal dimension of the cassette measured between the major walls 3 and 8 at the locations of the reel hubs. As a result of this, the hub has a slight axial clearance relative to the walls 3 and 8, which clearance is approximately 0.2 mm in the present embodiment. Each hub further comprises two flanges 21 and 22 having circumferential edges 23 and 24 respectively which are bevelled on their inner sides, i.e., the side which face one another.

In the present embodiment each of the major walls 3 and 8 respectively, is slightly thinner at the location of the flange 21 and 22 respectively in order to accommodate the respective flange and allow the housing to have a minimal height. For driving the reels 15 and 16 the end portions 17 and 18 of each reel hub have a shape such that each hub is engageable with the end portion of a drive spindle of a magnetic-tape cassette apparatus, which spindle is schematically indicated by the arrow 25 in FIG. 4, the coupling being such that when the cassette is in the operating position on the apparatus said axial clearance of the hub relative to the major walls occurs at that major wall of the housing which faces the apparatus. An end portion of a magnetic tape 26 is attached to each reel hub. Attachment is effected in the customary manner by clamping each end portion of the magnetic tape in a peripheral portion 27 of the respective hub which is situated between the respective flanges 21 and 22. The magnetic tape can be wound onto the reel hubs 13 and 14, the diameter of the flanges 21 and 22 being such that, starting from the circumference of each reel hub, only a limited number of turns or layers of tape is supported by the flanges on each reel hub.

It is to be noted that the flanges may have a greater diameter, the maximum radius of the flanges being limited to half the center-to-center distance between the reel hubs 13 and 14.

The first long side wall formed by the wall portions 4 and 9 is formed with apertures for the passage of parts of a magnetic-tape cassette apparatus which cooperate with the magnetic tape 26. Inside the housing, on the main section 2, a first pair of tape guides 28 and 29 is arranged near the ends of the second long side wall at the rear corners of the cassette housing. At its end which adjoins the main section 2, each of the tape guides 28 and 29 is provided with a stationary height guide 30 for the tape, which guide is formed on the major wall 8. As can be seen in FIG. 2 and FIG. 3, each of the tape guides 28 and 29 comprises a similar height guide 31 formed on the major wall 3. The height guides 30 and 31 of each tape guide have ramp portions 32 and 33 respectively near that side of the tape guide which faces the first long side wall, which ramp portions converge in direction of tape transport from the first long side wall towards the adjacent reel. Preferably, the tape is in contact with each of the tape guides 28 and 29 through an angle of at least 90°. The height guides 30 and 31 of each tape guide are located adjacent the area at which the tape is in contact with the respective tape guide and guide the edges of the magnetic tape 26. Screws 34, of which one is shown in FIG. 3, are inserted through apertures in the corner section 1 and screwed into threaded bores in the tape guides 28 and 29 to secure the cover section 1 to the main section 2 and thus close the housing of the magnetic-tape cassette. The distance between the height guides 30 and 31 corresponds at least substantially to the distance between the flanges 20 and 21 (which distance depends on the width of the magnetic tape) plus the axial clearance of the reel hub 13 and 14 respectively. Further, when the cassette has been placed on a magnetic-tape cassette apparatus, a tangent plane to a respective one of end portions 35 and 36 of the height guides 31 and 30 respectively of each tape guide 28 and 29 substantially coincides, as is shown in FIG. 4, with a tangent plane to the inner side of the flange 21 or 22 respectively on the relevant reel hub. An example of such a tangent plane to the end portion 35 and the flange 21 is indicated by the reference numeral 37 in FIG. 4.

As can be seen in FIG. 1 a second pair of tape guides 38 and 39 is arranged at the front corners of the cassette housing for guiding the magnetic tape along the long side wall of the cassette housing in which apertures are formed. Between the tape guides 38 and 39 two pressure rollers 40 are arranged on the main section 2 for cooperation with a capstan of a magnetic-tape cassette apparatus, for which cooperation apertures are formed in the major walls 3 and 8. A wall 41 on the main section 2, between the pressure rollers 40, is provided near the wall ends with supports 42 and 43 in which threaded bores are formed to receive screws for securing the cover section 1 to the main section 2. The wall 41 further comprises a central portion which may be provided with a screen for screening a magnetic head from the reels 15 and 16.

When the magnetic-tape cassette described above is in use on a magnetic-tape cassette apparatus, the magnetic tape 26 is transported between the two reels 15 and 16 along the long side wall formed with apertures, via the tape guides 28, 38, 39 and 29 or in the reverse direction depending on the direction of the transport. To attach each end of the magnetic tape to the peripheral portion 27 of the respective reel hub in such a way that the longitudinal axis of the tape is exactly perpendicular to the axis of the reel hub is almost impossible and in practice a deviation occurs. This deviation tends to cause the turns of tape to shift upwards or downwards when the magnetic tape is being wound onto a reel hub. However, this shift is prevented by the flanges 20 and 21 on the reel hub. In this way the flanges 20 and 21 compensate for an incorrect attachment of the magnetic tape to a reel hub. For this compensation it suffices for the tape edges to be supported by the flanges over only a limited number of turns, so that in principle the diameter of the flanges may be limited. As a result of the axial play of the reel hubs between the major walls 3 and 8, each time the cassette is placed on a magnetic-tape cassette apparatus, the height guide and the flange which are farther from the cassette apparatus in FIG. 4, the height guide 33 and the flange 21 are almost exactly in line. Thus, the magnetic tape 26 is fed accurately towards the reel hub. To guide the magnetic tape accurately it is essential that the magnetic tape is in contact with each of the tape guides 28 and 29 through a suitable angle. As a result of this, the height guides 30 and 31 may play an active part in the guidance of the tape without giving rise to deformation of the tape edges, because at the area of contact with the tape guides the magnetic tape is sufficiently rigid for such a guidance of the tape edges. Further, for accurately winding the magnetic tape it is important that the reels exhibit a minimal eccentricity during winding. Therefore, it is essential that the end portions of each reel hub are journalled so that the radial play is substantially zero. As a result of this combination of steps, namely the presence of the active height guides, the play-free journalling of the reels, and the presence of the flanges, jamming of the magnetic tape inside the housing of the magnetic-tape cassette in accordance with the invention is substantially precluded. Also, when the cassette is reversed on the magnetic-tape cassette apparatus the effect just described is again obtained because upon reversal the axial clearance of each reel hub again occurs at that side of the housing which faces the apparatus as a result of the engagement of the respective drive spindle of the magnetic-tape cassette apparatus with the hub. This ensures that the respective height guide is again in line with the adjacent flange on the reel hub.

As is shown in FIG. 5 and FIG. 6 it is alternatively possible to provide the pair of tape guides 38 and 39 in the first embodiment with the height guides for the magnetic tape. For this purpose this embodiment comprises a pair of tape guides 44 and 45 each provided with a height guide 46 at its end which adjoins the major wall 8. The cover section 1 comprises height guides 47. In this way it is possible to guide the magnetic tape in an accurate manner directly from the long side wall of the cassette housing in which the apertures are formed directly towards the reels.

As shown in FIGS. 7 and 8, near two tape guides 48 which, like the tape guides 44 and 45 in FIG. 5, are disposed near the front corners of the cassette housing, pressure elements 49 may be arranged, which elements are tiltably supported by a spindle 50 which extends parallel to the long side-wall portion 9 and the major wall 8 of the cassette housing. Thus, in this third embodiment each pressure element 49 is tiltably mounted in the adjacent tape guide 48. The advantage of this construction is that when the magnetic-tape cassette has been placed on an apparatus and a capstan 51 moves the magnetic tape, the respective pressure element 49 can position itself in relation to the capstan 51. This ensures an optimum transport of the magnetic tape, the immediately subsequent guidance of the magnetic tape provided by the respective tape guide 48 and the associated height guides being possible in an effective manner.

It is to be noted that it is alternatively possible to arrange each pressure element 49 at a distance from the respective tape guide 48, for example, at a location similar to that of the pressure rollers 40 in the embodiment shown in FIG. 1.

What is claimed is:

1. A magnetic-tape cassette comprising a housing having two rectangular major walls, two long side walls and two short walls defining corners of the housing, two reel hubs mounted for rotation in the major walls, a pair of tape guides arranged at or near said corners of the cassette housing, and a length of magnetic-tape wound on and extending between said hubs, a first one of said long side walls being formed with apertures, said magnetic-tape being passed over said guides in contact therewith so as to guide said tape past said apertures, characterized in that the reel hubs are mounted to fit substantially without play in the major walls, each of the reel hubs comprises a pair of opposed flanges near respective ends of the hub, the flanges each having a diameter such that, starting from the circumference of the reel hub, the flanges support at least some of the turns of tape on the hub in an axial direction, each of the tape guides comprises two height guides for supporting edges of the tape in directions parallel to the axis of the reel hubs; near that side of the respective tape guides which faces the first long side wall, the two height guides of each respective tape guide converge from the direction of said first long side wall as the tape is passed over said guides, the height guides guiding tape edges at least at an area of contact between the tape and the respective guide, and at least when the cassette is placed on a magnetic-tape cassette apparatus, a plane tangent to that end portion of a height guide of a tape guide which is disposed near a given reel hub substantially coincides with a plane tangent to the inner side of a respective one of the flanges of the given tape guide.

2. A cassette as claimed in claim 1, characterized in that the reel hubs are each arranged between the major walls with a small axial clearance and the distance between the two height guides of each tape guide substantially corresponds to the distance between the two flanges on each reel hub plus the clearance.

3. A cassette as claimed in claim 2, characterized in that each reel hub has end portions which are journalled in the major walls and which, for driving the hubs, are engageable with the drive spindles of the magnetic-tape cassette apparatus in such a way that when the cassette is in the operating position on the apparatus the axial clearance of the reel hubs relative to the major walls occurs at that major wall of the cassette housing which faces the apparatus.

4. A cassette as claimed in claim 3, characterized by comprising two pressure elements arranged near the tape guides adjacent the first long side wall, and means for mounting said pressure elements to the housing such that said elements are tiltable about an axis parallel to the long side walls and the major walls of the cassette housing.

5. A cassette as claimed in claim 4, characterized in that the pressure elements are tiltably mounted in the tape guides.

6. A cassette as claimed in claim 5, characterized in that the height guides are stationary and are formed on the lower and upper major walls of the cassette housing.

7. A cassette as claimed in claim 3, characterized in that the tape guides are situated at corners of the cassette housing near the ends of a second one of said long side walls.

8. A cassette as claimed in claim 7, characterized in that the height guides are stationary and are formed on the lower and upper major walls of the cassette housing.

9. A cassette as claimed in claim 1, characterized in that the tape guides are situated at corners of the cassette housing near the ends of a second one of said long side walls.

10. A cassette as claimed in claim 9, characterized in that the height guides are stationary and are formed on the lower and upper major walls of the cassette housing.

11. A cassette as claimed in claim 1, characterized in that the flanges on each reel hub have a diameter such that, starting from the circumference of the reel hub, the flanges support only a limited number of turns of tape in the axial direction, and the circumferential edges of the two flanges on each reel hub are bevelled on their inner sides.

12. A cassette as claimed in claim 11, characterized in that the reel hubs are each arranged between the major walls with a small axial clearance and the distance between the two height guides of each tape guide substantially corresponds to the distance between the two flanges on each reel hub plus the clearance.

13. A cassette as claimed in claim 12, characterized in that each reel hub has end portions which are journalled in the major walls and which, for driving the hubs, are enageable with the drive spindles of the magnetic-tape cassette apparatus in such a way that when the cassette is in the operating position on the apparatus the axial clearance of the reel hubs relative to the major walls occurs at that major wall of the cassette housing which faces the apparatus.

14. A cassette as claimed in claim 13, characterized by comprising two pressure elements arranged near the tape guides adjacent the first long side wall, and means for mounting said pressure elements to the housing such that said elements are tiltable about an axis parallel to the long side walls and the major walls of the cassette housing.

15. A cassette as claimed in claim 14, characterized in that the pressure elements are tiltably mounted in the tape guides.

16. A cassette as claimed in claim 1, characterized by comprising two pressure elements arranged near the tap guides adjacent the first long side wall, and means for mounting said pressure elements to the housing such tat said elements are tiltable about an axis parallel to the long side walls and the major walls of the cassette housing.

17. A cassette as claimed in claim 16, characterized in that the pressure elements are tiltably mounted in the tape guides.

18. A cassette as claimed in claim 13, characterized in that the tape guides are situated at corners of the cassette housing near the ends of a second one of said long side walls.

* * * * *